(12) United States Patent
Holmes

(10) Patent No.: US 6,647,198 B2
(45) Date of Patent: Nov. 11, 2003

(54) APPARATUS FOR HOUSING FIBER OPTIC MODULES

(75) Inventor: Frederick J. Holmes, Plainville, MA (US)

(73) Assignee: Semco Machine Corporation, Wrentham, MA (US)

( * ) Notice: Subject to any disclaimer, the term of this patent is extended or adjusted under 35 U.S.C. 154(b) by 198 days.

(21) Appl. No.: 09/898,617

(22) Filed: Jul. 3, 2001

(65) Prior Publication Data

US 2002/0015571 A1 Feb. 7, 2002

Related U.S. Application Data

(60) Provisional application No. 60/218,296, filed on Jul. 14, 2000.

(51) Int. Cl.[7] .................................................. G02B 6/00
(52) U.S. Cl. ......................................... 385/134; 385/92
(58) Field of Search ............................ 385/134, 88, 89, 385/59, 60

(56) References Cited

U.S. PATENT DOCUMENTS

| 4,162,816 | A | * | 7/1979 | Malsot ........................ 439/246 |
| 5,138,678 | A | * | 8/1992 | Briggs et al. ................. 385/87 |
| 5,845,027 | A | * | 12/1998 | Bruch et al. .................. 385/88 |
| 6,081,642 | A | * | 6/2000 | Asada .......................... 385/87 |
| 6,146,023 | A | * | 11/2000 | Weigel ......................... 385/59 |

* cited by examiner

Primary Examiner—Tulsidas Patel
(74) Attorney, Agent, or Firm—John A. Haug

(57) ABSTRACT

A fiber optic module housing (10) has a plurality of module seats (12a) for receipt of fiber optic modules (16) having a connector portion extending through a connector opening (12b) of a front wall of the housing. A pressure bar (14i) is integrally connected to the cover (14) through hinges (14h) and is movable to depress a locking arm (16b) of the connectors. A hole (12h) is provided in the back wall of base (12) in alignment with each module seat for a straight test configuration and posts (12j) are provided in a recess (12d) of the base for a loop test configuration. In one embodiment the connector openings are aligned in a straight line and in another they are aligned in a stepped configuration.

11 Claims, 8 Drawing Sheets

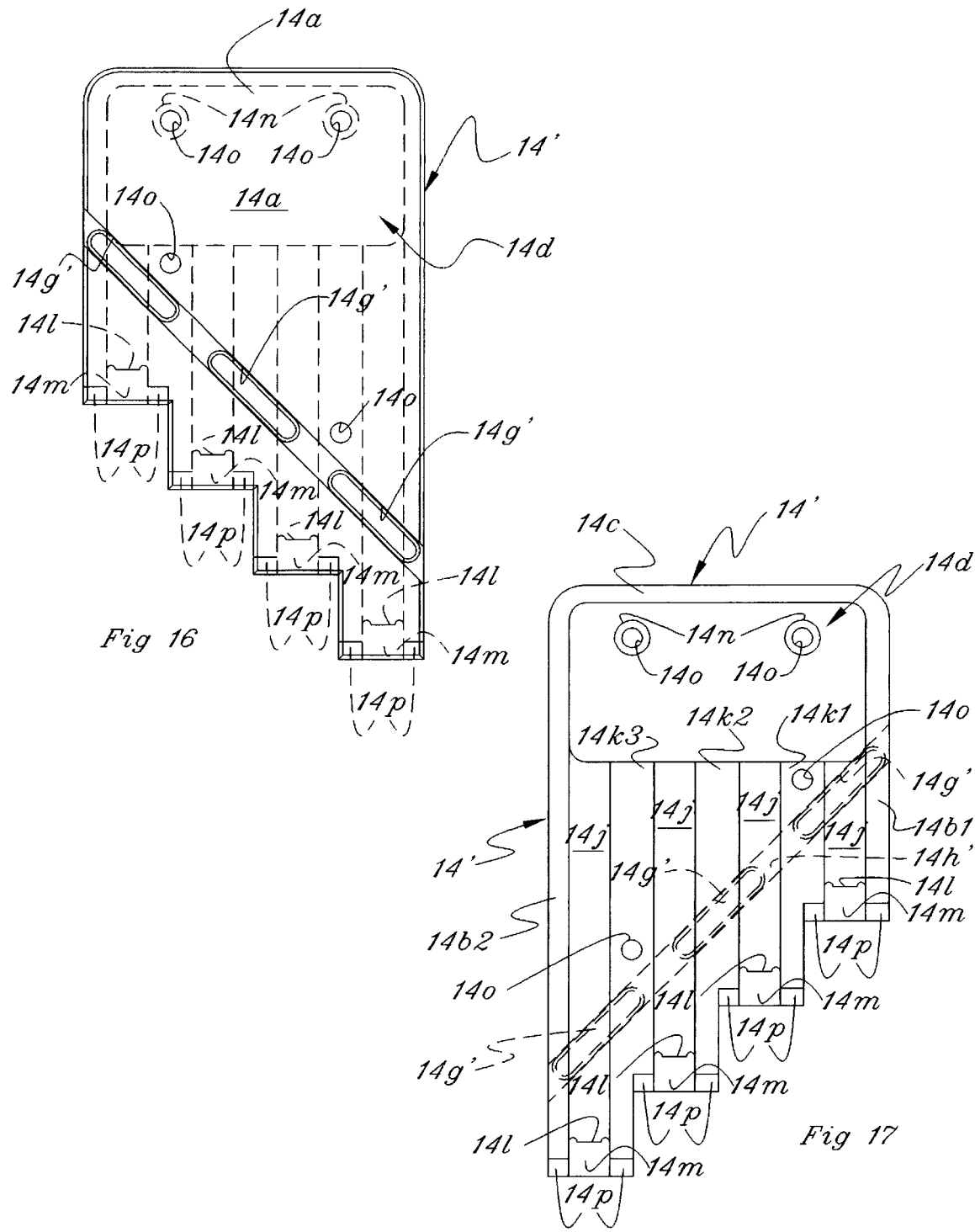

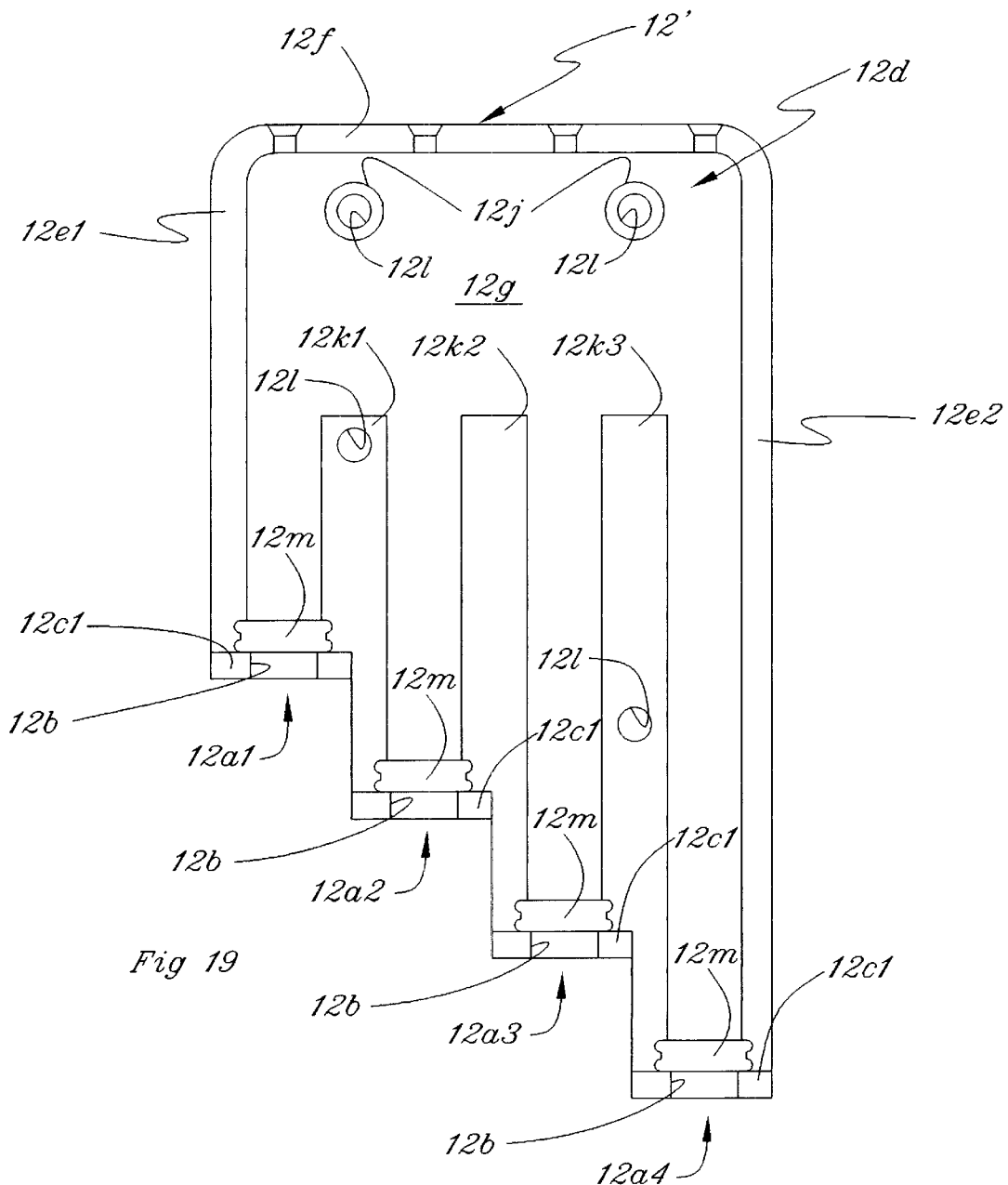

APPARATUS FOR HOUSING FIBER OPTIC MODULES

RELATED APPLICATIONS

Priority is claimed based on Provisional Application No. 60/218,296 filed Jul. 14, 2000.

FIELD OF THE INVENTION

This invention relates generally to the testing of electronic equipment using fiber optic cables for interconnecting test equipment with units to be tested and more particularly to apparatus for preventing damage to fiber optic connectors used with such cables.

BACKGROUND OF THE INVENTION

In testing electronic equipment using fiber optic cables to interconnect test equipment with units to be tested, it is conventional for test operators to insert the fiber optic connectors, one at a time, into a mating receptacle on a board of a unit to be tested. Upon completion of the test, the operators pull out fiber optic cables and frequently damage one or more connectors in the process thus destroying the connector(s).

SUMMARY OF THE INVENTION

It is an object of the present invention to provide apparatus which overcomes the prior art limitation noted above. Another object of the invention is the provision of apparatus to facilitate testing of electronic units using cables to interconnect electronic testing equipment with electronic units to be tested by permitting the insertion of a plurality of connectors into a receptacle of the unit to be tested at a given time. Yet another object of the invention is the provision of apparatus which will prevent damage to the fiber optic cable and respective connector when used in either a straight or a loop configuration.

Briefly stated, in accordance with the invention, a base is provided with a plurality of parallely extending fiber optic transmitter/receiver module seats. Modules are placed in their respective seats, four as shown in a preferred embodiment of the invention, with the connector portion of the modules extending outwardly from a respective opening in the front wall of the base. If a straight configuration is employed, the fiber optic cables are trained through respective openings in the rear wall of the base. On the other hand, if a loop-back configuration is employed, the cable is looped around guide posts provided in a cavity in the base. A cover is then placed on top of the base and secured thereto to capture the modules in their seats and to form a module housing.

The module housing is then brought to the receptacle of the unit to be tested (not shown) and the several connectors projecting therefrom are inserted as a unit into the receptacle. When the test has been completed, a hinged portion of the cover is depressed with the bottom surface of the hinged portion engaging each of the several connectors thereby depressing them to disengage the connectors from the receptacle and allow the housing (and connectors) to be removed without fear of damage.

Additional objects and features of the invention will be set forth in part in the description which follows and in part will be obvious from the description. The objects and advantages of the invention may be realized and obtained by means of the instrumentalities and combinations particularly pointed out in the appended claims.

BRIEF DESCRIPTION OF THE DRAWINGS

Other objects, advantages and details of the novel and improved fiber optic module housing of the invention appear in the following detailed description of preferred embodiments of the invention, the detailed description referring to the drawings in which:

FIGS. 16 and 17 are top and bottom plan views, respectively, of the cover of a module made according to another embodiment of the invention, FIG. 18 is a side elevational view, partly in cross section, of FIG. 16, and FIG. 19 is a top plan view of a base used with the FIGS. 16, 17 module cover.

DESCRIPTION OF PREFERRED EMBODIMENTS

Figure 1:
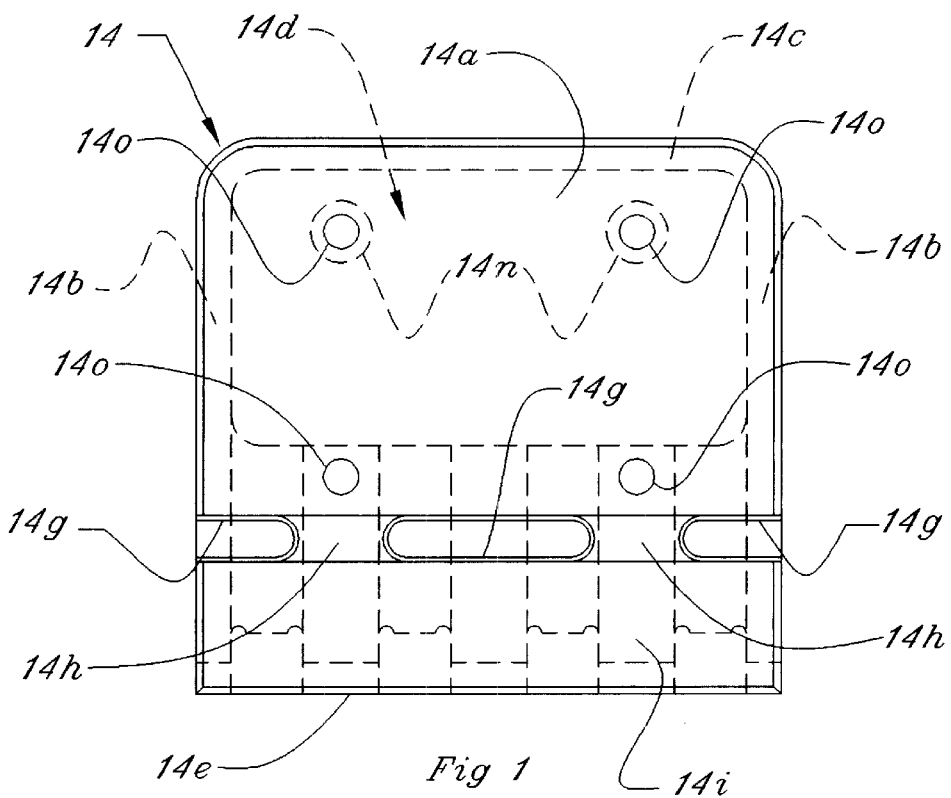
FIG. 1 is a top plan view of the cover of a module housing made in accordance with the invention.
Figure 2:
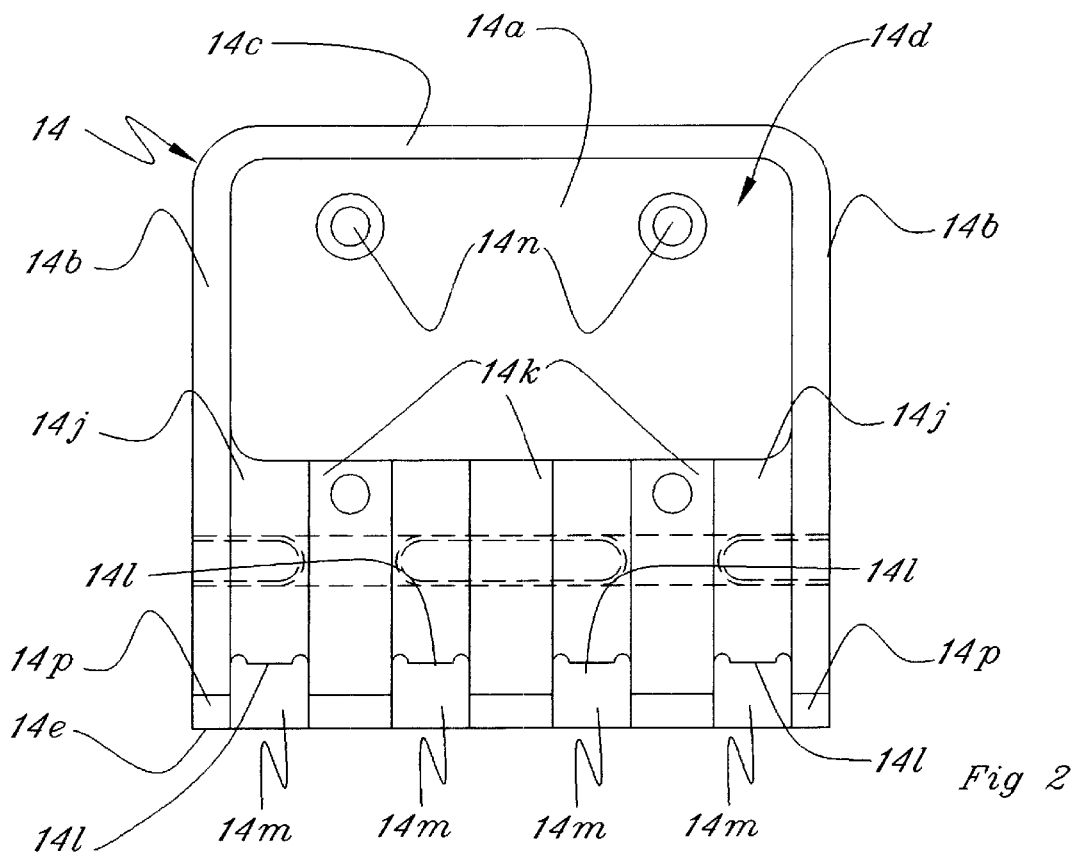
FIG. 2 is a bottom plan view of the FIG. 1 cover.
Figure 3:
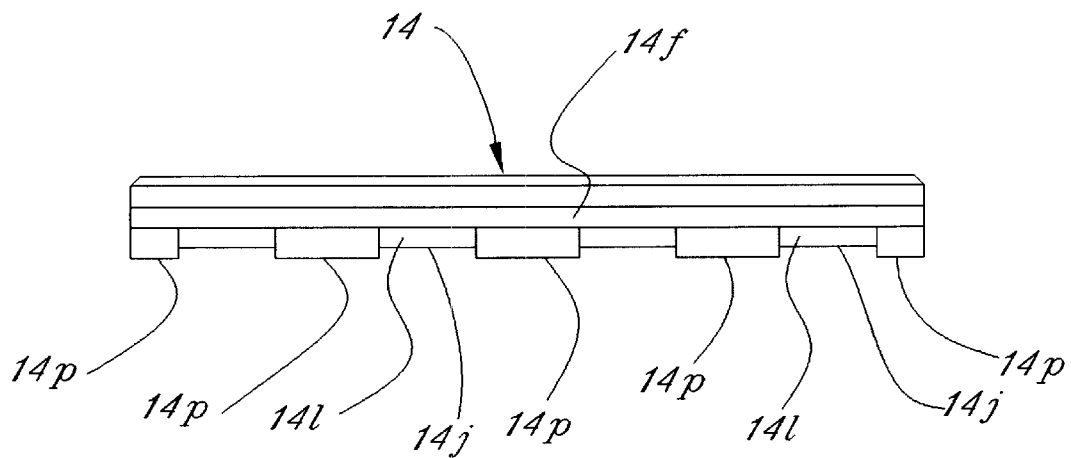
FIG. 3 is a front elevational view of the FIG. 1 structure.
Figure 4:
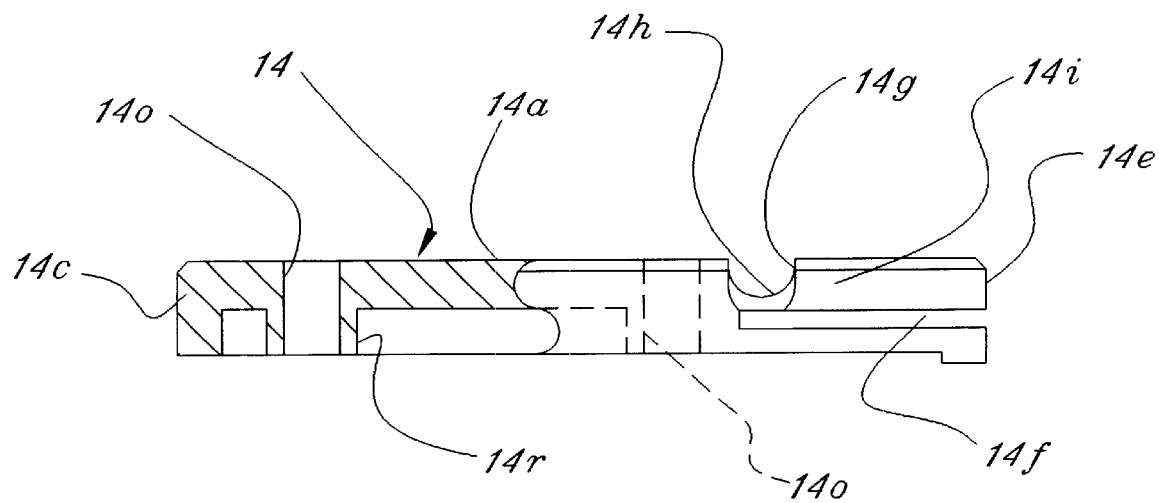
FIG. 4 is a side elevational view, partly in cross section, of FIG. 1, FIGS. 5, 6 and 7 are rear elevational, top plan and front elevational views, respectively, of the base of a module housing made in accordance with the invention.
Figure 5:
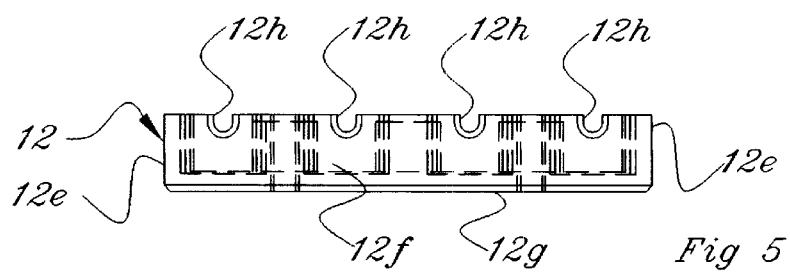
Figure 6:
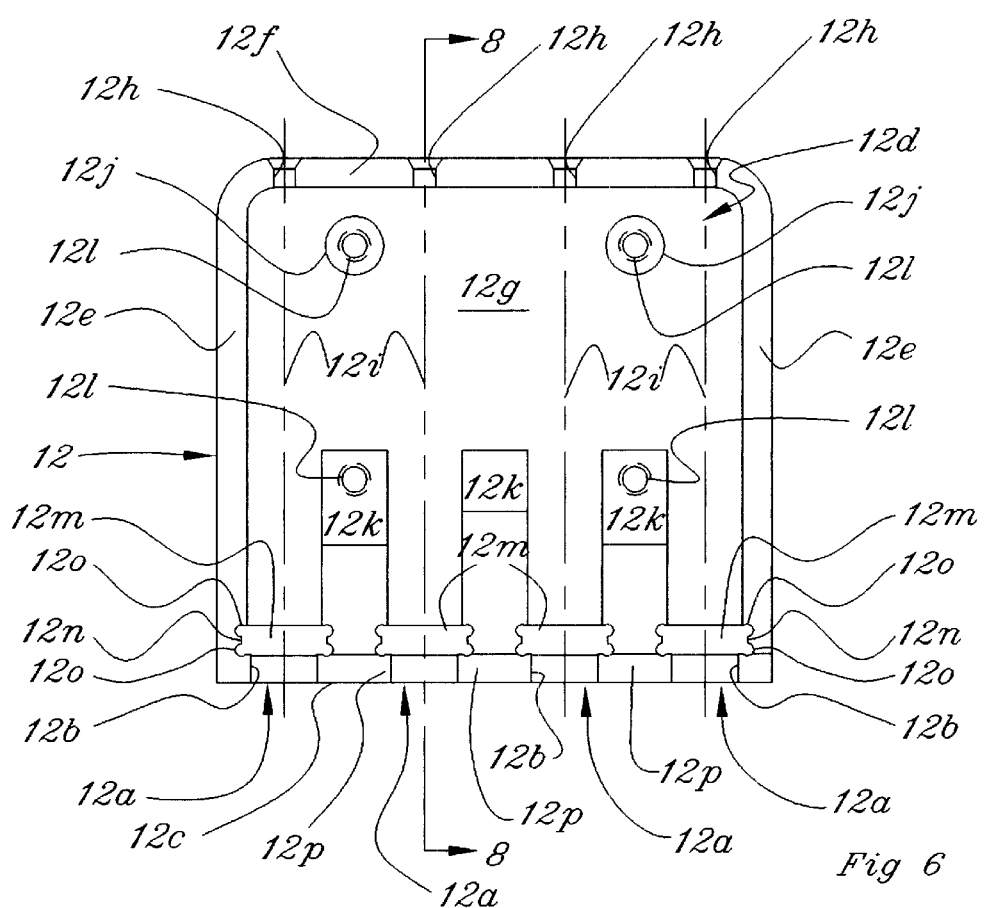
Figure 7:
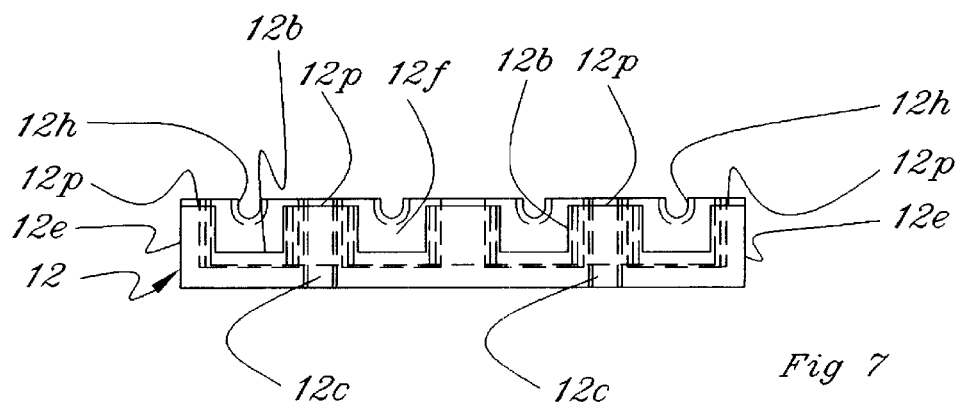
Figure 8:
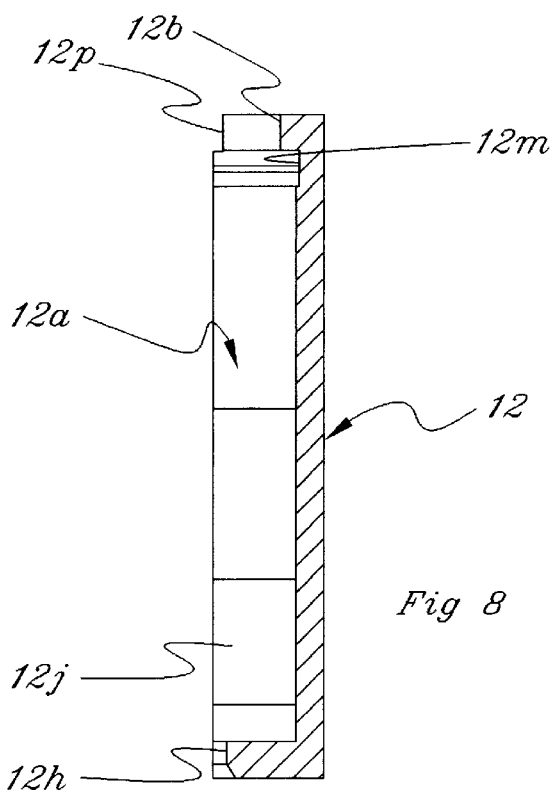
FIG. 8 is a cross sectional view taken on line 8—8 of FIG. 5.
Figure 9:
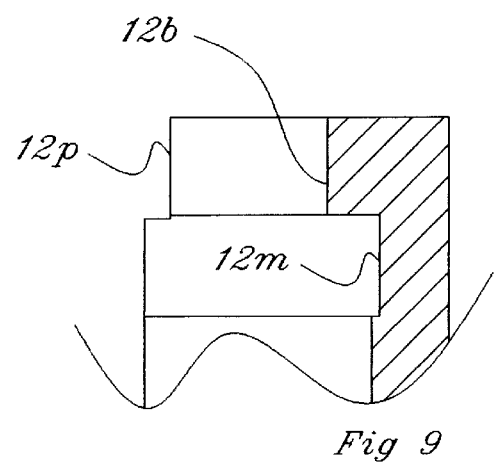
FIG. 9 is an enlarged, broken away portion of FIG. 8.
Figure 10:
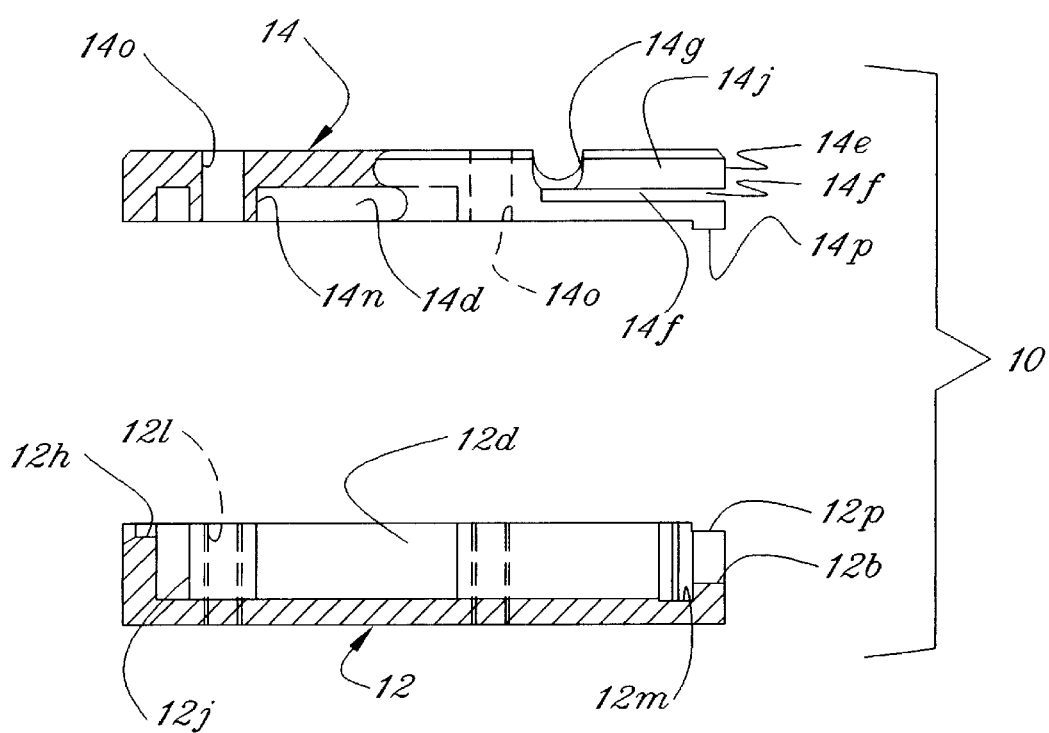
FIG. 10 is an exploded side elevational view, partly in cross section, of a module housing comprising the cover of FIG. 1 and the base of FIG. 6.
Figure 11:
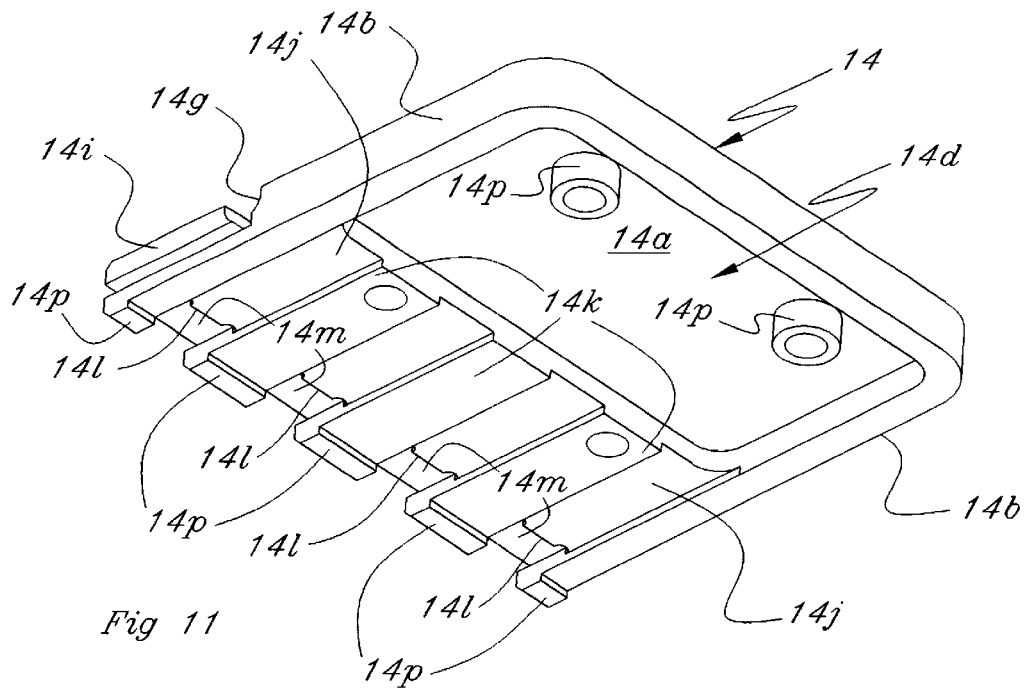
FIG. 11 is a perspective view of the FIG. 1 cover looking from below and from in back of the cover.
Figure 12:
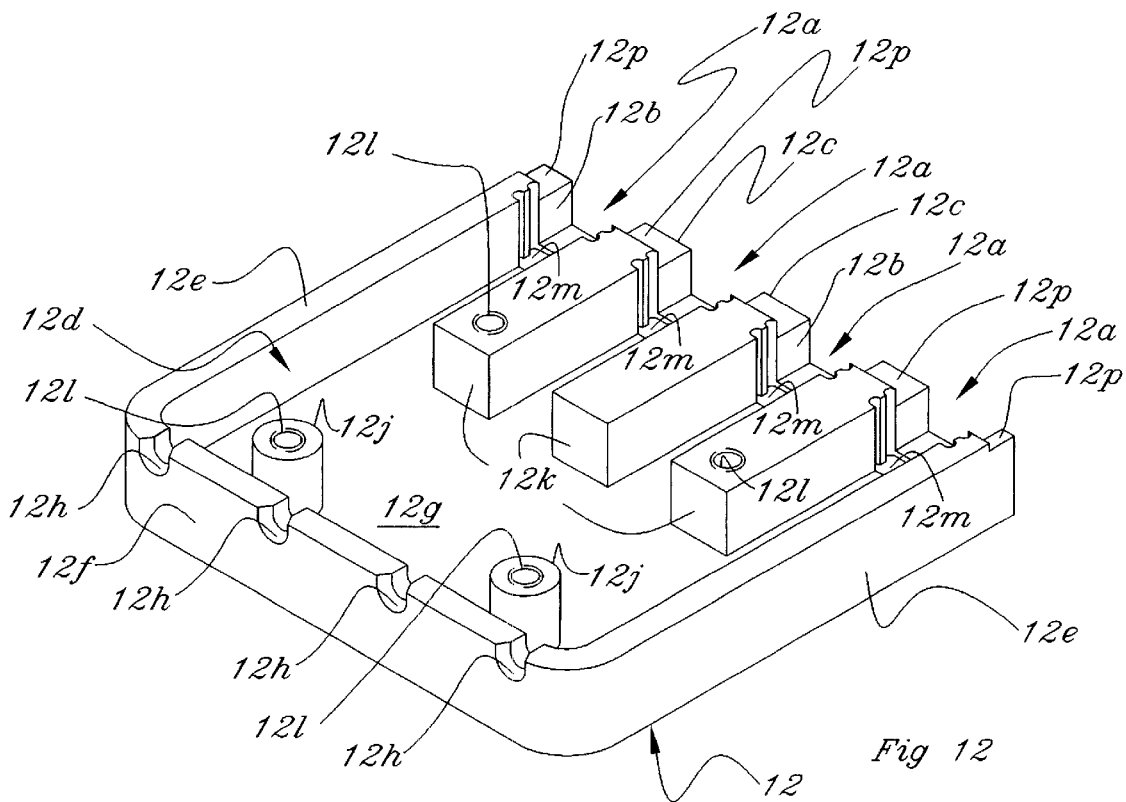
FIG. 12 is a perspective view of the FIG. 6 base looking from above and from in back of the base.

Fiber optic module holding housing 10 made in accordance with the invention comprises a base 12 and interfitting cover 14 preferably composed of suitable moldable resinous material. With particular reference to FIGS. 5–9 and 12, a plurality of parallely extending, generally elongated channel shaped module seats 12a are formed in base 12 and extend inwardly from respective openings 12b in front wall 12c (outboard end) into a recessed area 12d (inboard end) bounded by side walls 12e, back wall 12f and bottom wall 12g, as well as front wall 12c and channel separators 12k. A hole 12h is formed in back wall 12f for each module seat 12a in alignment with a longitudinal axis 12i of the respective channel shaped module seat. Holes 12h are provided in back wall 12f for a purpose to be discussed below.

A guide post 12j extending upwardly from bottom wall 12g is located near back wall 12f preferably in alignment with the channel separator portion 12k closest to each side wall 12e. A bore 12l is formed through each post 12j and two channel separator portions 12k for receipt of suitable connectors (not shown) to attach cover 14 to base 12, to be discussed further below.

A module head receiving, transversely extending groove 12m is formed in bottom wall 12g at the mouth or outboard end of each module seat 12a just inboard of wall 12c. The bottom of each opening 12b is located above the plane in which the surface of bottom wall 12g lies. An upwardly extending guide rib 12n is formed between opposed vertically extending clearance grooves 12o in the side walls and channel separator portions at the ends of each groove 12m.

With reference to FIGS. 1–4 and 11, cover 14 is configured to be received on top of base 12 to enclose recess 12d as well as module seats 12a. Cover 14 has a top wall 14a formed with downwardly extending, opposed side walls 14b and back wall 14c forming a recess 14d which is aligned with recess 12d of the base when the cover is attached to the base. Channel separator portions 14k extend parallel to one another, from front portion 14e of the cover back to recess 14d and are located so that, when the cover is placed on base 12, channel separator portions 14k of the cover are in alignment with channel separator portions 12k of the base.

A slot 14f is formed in the front portion of the cover which extends generally parallel to a plane in which the top surface of top wall 14a lies. The slot extends toward the back of the cover to a location vertically aligned with a position intermediate to the front and back ends of channel separator portions 14k. A transversely extending groove 14g generally aligned with the inner end of slot 14f is formed in the upper portion of the cover. Groove 14g extends into slot 14f, except for spaced apart living hinges 14h, forming a pressure bar 14i. The bottom surface of cover 14 between each wall 14b and the channel separator portion 14k adjacent thereto and between adjacent channel separator portions 14k is recessed slightly at 14j to form a vertical continuation of channel shaped module seats 12a. The cover is cut away at 14l at each recessed portion 14j exposing the bottom surface 14m of pressure bar 14i longitudinally aligned with each module seat 12a. Cut away portion 14l is aligned with the inner portion of tranversely extending groove 12m when cover is placed on base 12.

A guide post portion 14n extends downwardly from top wall 14a in alignment with each guide post 12j of the base when the cover is mounted thereon and is provided with a bore 14o to form a continuation of a respective bore 12l of the base. A bore 14o is also formed in the channel separator portions 14k which are in alignment with the bores of channel separators 12k of the base. A downwardly extending lip 14p is formed at the front portion of side walls 14b and channel separator portions 14k for receipt on a cut away shelf 12p on side walls 12e and front wall 12c.

Figure 13:
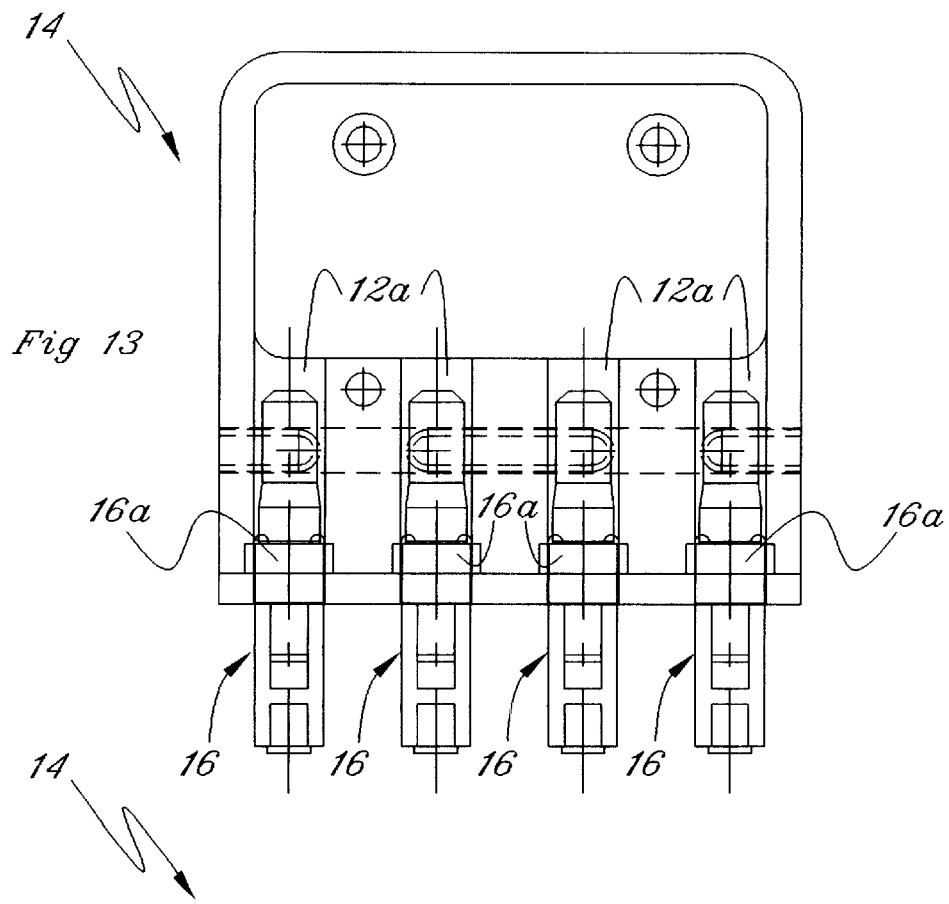
FIG. 13 is a bottom plan view of the FIG. 2 cover shown with fiber optic modules disposed in respective module seats.
Figure 14:
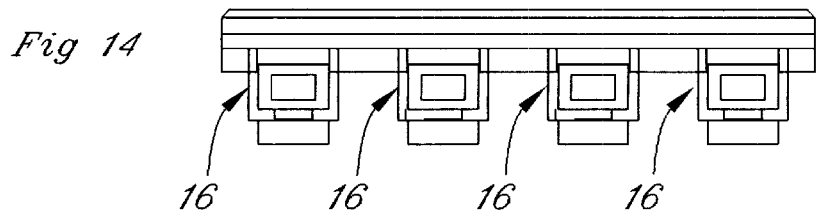
FIG. 14 is a front view of the FIG. 13 structure.
Figure 15:
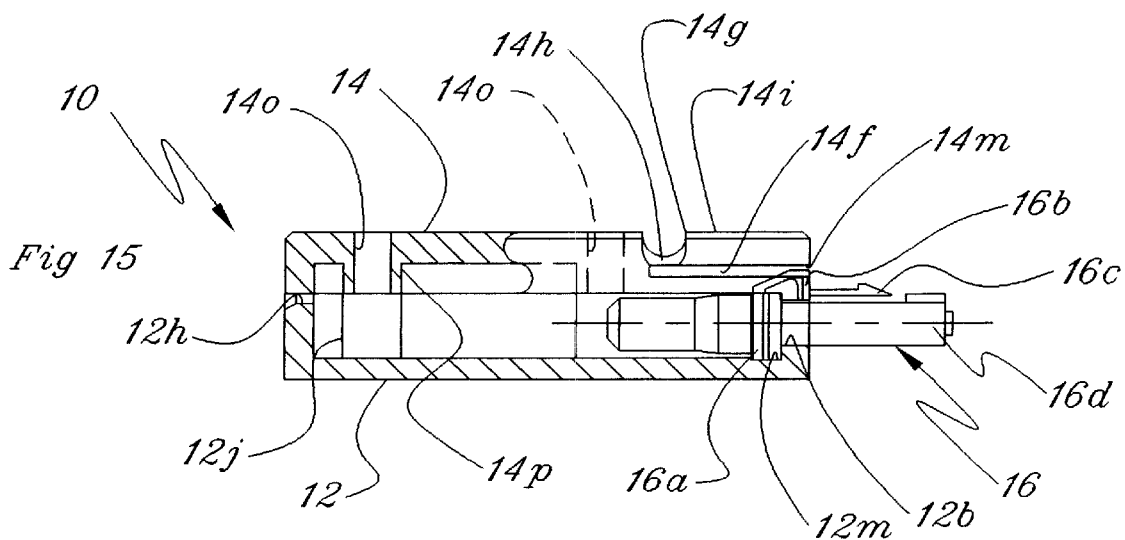
FIG. 15 is a partial cross sectional view of the housing with a fiber optic module in a module seat.

A respective module 16 is received in each channel shaped seat 12a as seen in FIGS. 13–15, with a head portion 16a received in groove 12m and connector portion 16d projecting through opening 12b. A locking arm 16b having a locking catch 16c is disposed in alignment with lower surface portion 14m of pressure bar 14i. The corresponding optical fiber (not shown) is trained through hole 12h for the straight test configuration, or with the optical fiber looped around guide post 12j from a module in one seat 12a to a module in the adjacent seat 12a for a loop-back test configuration, and then cover 14 is placed on base 12 and attached thereto using suitable fasteners (not shown) received through bores 12l/14o.

In use, an operator takes a module housing 10 with the connector portions 16d projecting out of openings 12b and places the housing so that the connector portions are received in female connector slots of a receptacle of a device to be tested and pushes the housing toward the device until the connectors are locked in the connector slots by locking catch 16c formed at the distal free end of locking arm 16b.

Upon completion of the testing procedure, the operator grasps the housing with his fingers on the pressure bar. The operator presses down on the pressure bar to depress locking arm 16b and catch 16c of each connector and at the same time takes the housing straight back from the device thereby removing all the connectors in the same motion without ever touching the connectors.

Although four module seats are shown in housing 10, it is within the purview of the invention to use more or fewer module seats, if desired. The number of hinges employed can also be varied, as desired; however, the two spaced apart living hinges of the preferred embodiment described above are particularly efficacious in transferring a force applied to the pressure bar essentially evenly to the locking arms of the connectors whether or not the force is centrally applied to the pressure bar. In other words, an operator can grasp the pressure bar at any convenient location and when pressed the force will be essentially evenly distributed to all the connector locking arms.

In the embodiment described above, openings 12a of the module seats are transversely aligned with one another, however, in a modified embodiment, the openings can be offset for use with equipment having offset receptacles. With respect to FIGS. 16–19, base 12' is provided with back wall 12f and side walls 12e1, 12e2 of unequal length. A recess 12d is provided as in the previous embodiment along with guide posts 12j. The channel shaped module seats 12a1, 12a2, 12a3 and 12a4 and channel separators 12k1, 12k2 and 12k3, however, are of increasing length with the seat openings 12b in front wall 12c1 forming a stepped configuration. Cover 14' is formed in the same manner as cover 14 of the previous embodiment but is configured to match the configuration of base 12' with side walls 14b1 and 14b2 being of unequal length and is formed with groove 14g' and living hinges 14h' extending along an imaginary line having a constant average distance from respective openings 12b. Operation of the FIGS. 16–19 embodiment is the same as that of the previous embodiment and need not be redescribed.

It will be understood that the invention includes all modifications and equivalents of the described embodiments falling within the scope of the appended claims.

What is claimed:

1. A fiber optic module housing comprising
a base having a recess formed with a front wall, the front wall formed with a plurality of connector openings, a plurality of fiber optic module seats formed within the recess in the base, each fiber optic module seat being in communication with a respective connector opening,
a cover having a front, back and opposite sides and a top wall having a top surface lying in a plane received over the recess, the cover formed with a slot through the top wall extending from the front to a location intermediate to the front and back and generally parallel to the said plane, the slot forming upper and lower cover portions, the lower cover portion engaging the base and having an opening therethrough aligned with each fiber optic module seat, the upper cover portion serving as a pressure bar hingedly connected to the cover and extending transversely across each of the fiber optic module seats at the front of the housing, the pressure bar normally positioned at a selected location above the openings in the lower cover portion and being flexibly movable toward the lower cover portion openings so that a fiber optic module received in respective fiber optic module seats with a connector projecting through respective connector openings and with respective connector locking arms disposed beneath the pressure bar movable between locking and unlocking positions will be biased to the unlocking position when the pressure bar is depressed.

2. A fiber optic module housing according to claim 1 in which the pressure bar is connected to the cover through two spaced apart hinges formed integrally with the cover and pressure bar.

3. A fiber optic module housing according to claim 1 in which the connector openings in the front wall are aligned along a straight line.

4. A fiber optic module housing according to claim 1 in which the connector openings in the front wall are aligned along a stepped line.

5. A fiber optic module housing according to claim 1 in which the housing has a back wall and a hole is formed through the back wall in alignment with each fiber optic module seat for a straight test configuration allowing an optical fiber to extend from front to back through the housing.

6. A fiber optic module housing comprising a base having a recess formed with a front wall, the front wall formed with a plurality of connector openings, a plurality of fiber optic module seats formed within the recess in the base, each fiber optic module seat being in communication with a respective connector opening, the recess in the base extending in back of each fiber optic module seat and a guide post is disposed in the recess for a loop-back test configuration allowing an optical fiber to extend from one fiber optic module seat around the guide post to another fiber optic module seat, and a cover received over the recess, a pressure bar hingedly connected to the cover and extending transversely across the front of the housing, the pressure bar normally positioned at a selected location above the connector openings and being flexibly movable toward the connector openings so that a fiber optic module received in respective fiber optic module seats with a connector projecting through respective connector openings and with a connector locking arm disposed beneath the pressure bar movable between locking and unlocking positions will be biased to the unlocking position when the pressure bar is depressed.

7. A fiber optic module housing comprising a base having a recess and formed with a plurality of parallely extending elongated channel shaped fiber optic module seats having an inboard end and an outboard end, a front wall formed with a connector opening in the front wall in alignment with each fiber optic module seat and being open at the top thereof for receipt of a connector of a fiber optic module received in a respective fiber optic module seat, a cover having a front, back and opposite sides received on the base over the recess, the cover having a top wall lying in a plane and having a depending front wall generally aligned with the front wall of the base, a slot formed in the cover extending from side to side through the front wall and into the top wall and extending in a plane generally parallel to the plane of the top wall, the slot forming an upper portion serving as a transversely extending pressure bar having a force applying lower surface integrally connected by a hinge portion and overlying the outboard end of the fiber optic module seats, the cover having a lower bottom wall portion below the slot received over each fiber optic module seat but formed with an opening over the outboard end of each fiber optic module seat, the pressure bar being movable between a normal raised locking position and a lowered, unlocking position so that a connector of a fiber optic module disposed in a fiber optic module seat and having a locking arm on the connector extending through the opening at the top of each connector opening in the front wall and being movable between an upper locking position and a lower unlocking position disposed at the outboard end of the fiber optic module seat can be placed in the unlocking position by depressing the pressure bar so that the force applying surface engages the locking arms and moves each locking arm to the unlocking position.

8. A fiber optic module housing according to claim 7 in which two hinge portions integrally connect the pressure bar and the cover.

9. A fiber optic module housing according to claim 7 in which four fiber optic module seats are formed in the housing.

10. A fiber optic module housing according to claim 7 in which the base has a back wall and a hole is formed in the back wall in alignment with each fiber optic module seat to accommodate a straight test configuration allowing an optical fiber to extend from front to back through the housing.

11. A fiber optic module housing according to claim 7 in which the base has a back wall and a recess is formed in the housing in back of the fiber optic module seats between the back wall and the fiber optic module seats and a guide post is provided in the recess positioned between two adjacent fiber optic module seats to accommodate a loop-back test configuration allowing an optical fiber to extend from one optical fiber module seat around the guide post to another optical fiber module seat.

* * * * *